United States Patent
Armbruster et al.

[11] Patent Number: 5,920,804
[45] Date of Patent: Jul. 6, 1999

[54] METHOD AND APPARATUS FOR COMMUNICATIONS HAND-OFF BETWEEN MULTIPLE SATELLITE SYSTEMS

[75] Inventors: Peter Joseph Armbruster, Tempe; Kenneth Lee Sowles, Chandler; Daniel Richard Tayloe, Phoenix, all of Ariz.

[73] Assignee: Motorola, Inc., Schaumburg, Ill.

[21] Appl. No.: 08/626,589

[22] Filed: Apr. 2, 1996

[51] Int. Cl.$^6$ .................................................. H04B 7/185
[52] U.S. Cl. ................ 455/13.2; 455/12.1; 455/13.1; 455/8; 455/427; 455/428; 455/430; 455/453; 370/316; 342/353
[58] Field of Search ............................. 455/13.2, 13.1, 455/12.1, 8, 427, 428, 430, 9–10, 436, 438–439, 453; 370/316; 359/172; 342/352–358; 178/2; 136/292

[56] References Cited

U.S. PATENT DOCUMENTS

| | | | |
|---|---|---|---|
| 5,408,237 | 4/1995 | Patterson et al. | 455/12.1 |
| 5,410,728 | 4/1995 | Bertiger et al. | 455/13.1 |
| 5,439,190 | 8/1995 | Horstein et al. | 455/12.1 |
| 5,448,623 | 9/1995 | Wiedeman et al. | 455/12.1 |
| 5,574,968 | 11/1996 | Olds et al. | 455/12.1 |
| 5,625,867 | 4/1997 | Rouffet et al. | 455/13.1 |
| 5,625,868 | 4/1997 | Jan et al. | 455/13.4 |
| 5,655,005 | 8/1997 | Wiedeman et al. | 455/13.1 |
| 5,826,190 | 10/1998 | Krutz et al. | 455/13.2 |

*Primary Examiner*—Bryan Tung
*Assistant Examiner*—Vu Le
*Attorney, Agent, or Firm*—Sherry J. Whitney; Frank J. Bogacz

[57] ABSTRACT

A method and apparatus for handing off communications between a primary satellite system (500) and an alternate satellite system (550) determines (602) when a hand-off condition for the primary satellite system (500) exists. An alternate satellite (552) is determined (604, 904) which has a coverage area (554) which is positioned such that the alternate satellite (552) can provide an alternate communication link (556). A hand-off between the primary satellite system (500) and the alternate satellite system (550) is then performed (606). When the hand-off condition is alleviated (610), a hand-off back to the primary satellite system (550) is performed and normal operations are resumed (600).

5 Claims, 8 Drawing Sheets

METHOD AND APPARATUS FOR COMMUNICATIONS HAND-OFF BETWEEN MULTIPLE SATELLITE SYSTEMS

FIELD OF THE INVENTION

This invention relates generally to satellite communications and, more particularly, to handing off communication links between multiple satellite communications systems.

BACKGROUND OF THE INVENTION

A satellite communication system occasionally experiences conditions which cause the system to provide inferior service to system users. These conditions can include, for example, high traffic congestion on system links and holes in the system's communication coverage area. Other conditions which negatively impact service might include inefficiently routed information and high service costs.

In a satellite communication system, one or more satellites act as system access points which provide communication channels to ground facilities (e.g., gateways and subscriber units) within the system's coverage area. Where a satellite system is experiencing unusually high levels of traffic on the communication links within the system, the satellite system might be forced to refuse service to some users, terminate ongoing service for other users, or inefficiently route traffic through the system. Overly-congested links, thus, can significantly impact the quality of service provided by a satellite system.

Holes in a satellite system's coverage area also can negatively impact service provided. A system's coverage area defines the communication range of the system. If a ground facility is outside the coverage area, the system is unable to communicate with the ground facility. Some satellite systems have coverage areas which normally encompass the entire surface of the earth. Other satellite systems have coverage areas which only partially cover the earth.

During normal operations, a satellite system's coverage area is defined by the number of system satellites, their angles of elevation and altitudes, and the types of antennas which they employ. Occasionally, a system malfunction or planned satellite outage can affect a system's coverage area. For example, where a satellite is damaged and is unable to provide access into the system for a ground facility within its normal coverage area, an outage condition is likely to result. The outage condition typically continues until the satellite is repaired, replaced, or another satellite's coverage area encompasses the ground facility. The area within which the satellite system is unable to communicate during normal operations or as a result of an outage condition is referred to herein as a "coverage hole".

Prior art systems do not provide hand-off procedures which enable a second satellite system temporarily to provide communication services for a first satellite system. Thus, what is needed is a method and apparatus which enable a first satellite system temporarily to hand-off communication links to a second satellite as a result of conditions (e.g., overly-congested links or coverage holes) which cause the first satellite system to provide less-than-optimal communications service.

DETAILED DESCRIPTION OF THE DRAWINGS

The method and apparatus of the present invention enable a first satellite system temporarily to hand-off communication links to a second satellite as a result of conditions (e.g., overly-congested links or coverage holes) which cause the first satellite system to provide less-than-optimal communications service. Although the description of preferred and alternate embodiments of the invention often uses a coverage hole as a condition for handing off to a second satellite system, the use of a coverage hole is for the purposes of illustration and not of limitation. The method and apparatus of the present invention could be applied for any condition where a first satellite system desires to hand-off temporarily to a second satellite system.

As used herein, a "primary satellite system" or "primary system" is a satellite system having a coverage hole. Similarly, a "primary satellite" is a satellite associated with the primary system. Also as used herein, an "alternate satellite system" or "alternate system" is a satellite system which temporarily provides communication services for a primary system within the primary system's coverage hole. Similarly, an "alternate satellite" is a satellite associated with the alternate system.

Figure 1:
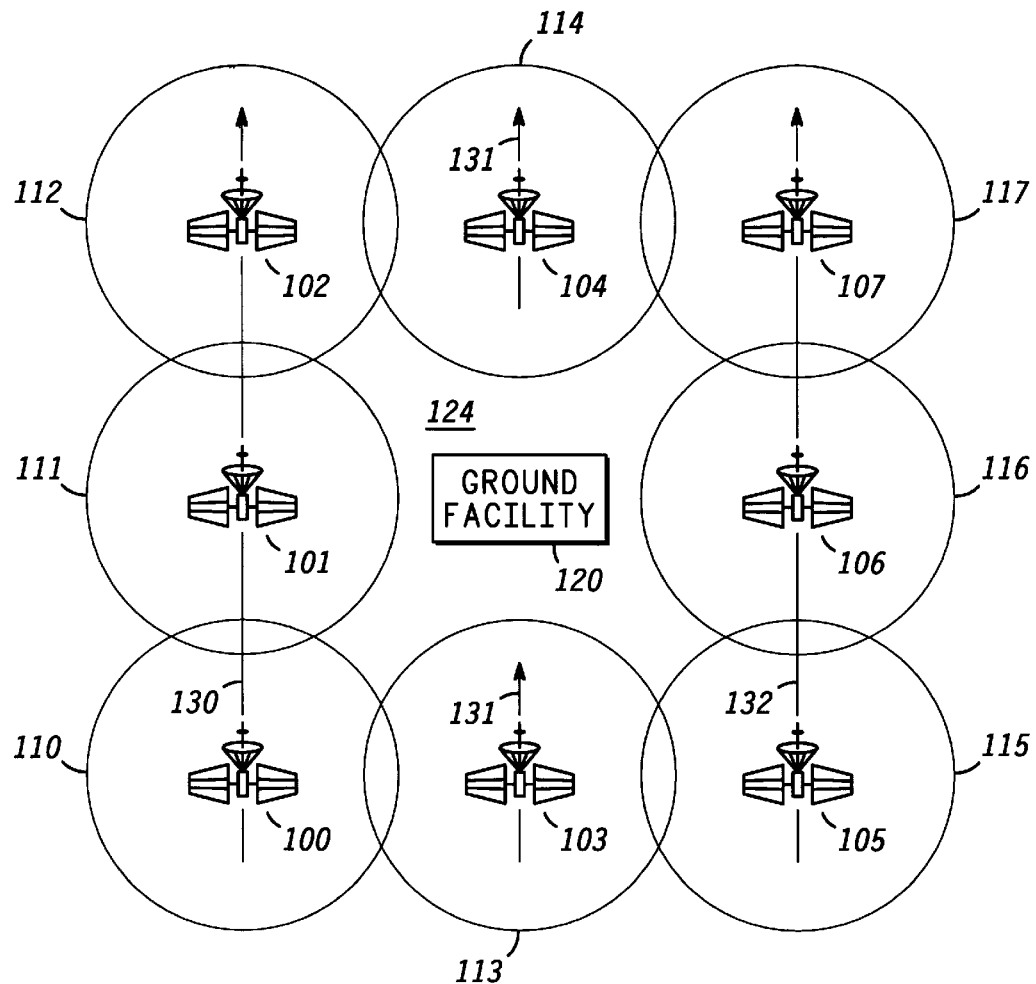
FIG. 1 illustrates an aerial view of a prior art coverage hole.

FIG. 1 illustrates an aerial view of a prior art coverage hole 124. The coverage hole condition is used below to describe the advantages of the method and apparatus of the present invention. Each satellite 100–107 of the illustrated satellite system has an associated satellite coverage area 110–117 within which each satellite 100–107 can communicate with ground facilities (e.g., ground facility 120). The total area covered by all satellite coverage areas 110–117 represents the system's coverage area.

A system's coverage area normally or occasionally can have gaps, or coverage holes, within which satellites 100–107 cannot communicate with ground facilities. FIG. 1 illustrates coverage hole 124 which encompasses ground facility 120. As a result of coverage hole 124, ground facility 120 is incapable of gaining access into the system of satellites 100–107.

Ground facility 120 can be, for example a switching gateway (GW). A GW is a switching device which interfaces a satellite system with a land-based communication system such as a Public Switched Telephone Network (PSTN) or a terrestrial cellular system. Typically a communication link between a GW and the satellite system has a broad bandwidth which enables numerous channels to be supported by the link.

Ground facility 120 also can be a fixed or movable communication unit (CU), which is a radio frequency (RF) device which enables one or more individuals to communicate directly with the satellite system. Typically a communication link between a CU and the satellite system has a relatively narrow bandwidth which supports one or a small number of channels.

Although the term "ground facility" is used, the term is meant to include communication devices or facilities which are not necessarily located on the ground, such as, for example airplane or ship-board communication devices.

A coverage hole can exist during normal operations of a satellite system, and also during a planned or unplanned satellite outage condition. A normally existing coverage hole could exist because, for example, the angle of elevation of a system's satellites is relatively low. In such a case, the system's satellites would not travel to higher latitudes in the course of their orbits and, thus, would be unable to provide coverage at those higher latitudes. At least two coverage holes would exist within such a system: one encompassing the north pole and one encompassing the south pole.

Another example where a normally existing coverage hole could exist is in a communication system which uses steerable satellite beams to provide coverage within more populated areas. Such a system might target its satellite beams only toward populated land regions, for example, while providing no coverage across the oceans or sparsely populated regions. Thus, multiple coverage holes would exist within the sparsely populated or ocean regions.

Coverage holes also can exist during planned or unplanned satellite outages. For example, in FIG. 1, a non-functioning satellite (not shown) might exist between satellites 103 and 104. The non-functioning satellite would be the direct cause of the existence of coverage hole 124 and, thus, the inability of ground facility 120 to gain access to the satellite system.

A coverage hole can be fixed or movable. In addition, a coverage hole can be temporary or permanent. In the above-described example of a communication system which uses satellites having low angles of elevation, the coverage holes at the north and south poles would be both fixed and permanent.

FIG. 1 illustrates a movable coverage hole 124. As satellites 100–107 travel along orbit paths 130–132, coverage hole 124 moves along with them. Eventually, satellite 103 will substantially encompass the area previously defining coverage hole 124 and satellite 103 will be able to communicate with ground facility 120. Coverage hole 124 might also be temporary, for example, where it is possible to repair or replace the satellite (not shown) which normally serviced the area defining coverage hole 124.

Although the satellite system depicted in FIG. 1 is unable to communicate with ground facility 120 at the time shown, the method and apparatus of the present invention enables communications with ground facility 120 by using an alternate satellite system which temporarily supports a communication link with ground facility 120 for the primary system shown in FIG. 1. As explained previously, rather than experiencing a coverage hole, a satellite system might not be able to communicate with, or might be able only partially to communicate with, a ground facility due to over-congestion of system links or some other condition which forces the satellite system to provide non-optimal service. The method and apparatus of the present invention enables full communications with an effected ground facility during these other conditions as well.

Figure 2:
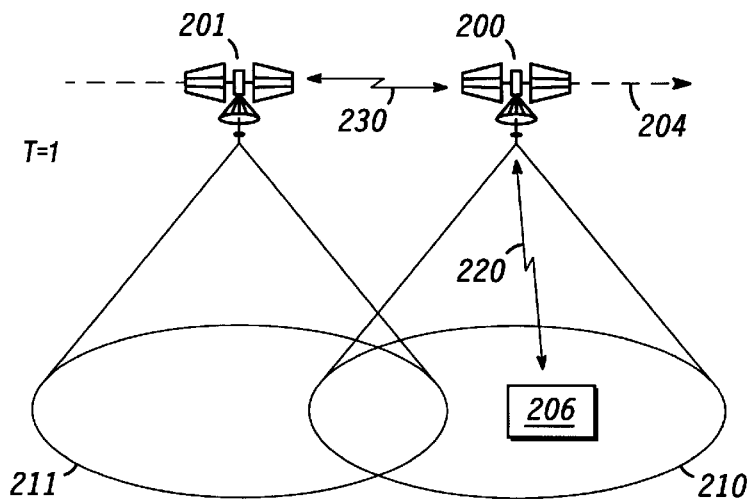
FIGS. 2–4 illustrate a sequence for a communication link hand-off between satellites of a satellite system in accordance with the prior art.
Figure 3:
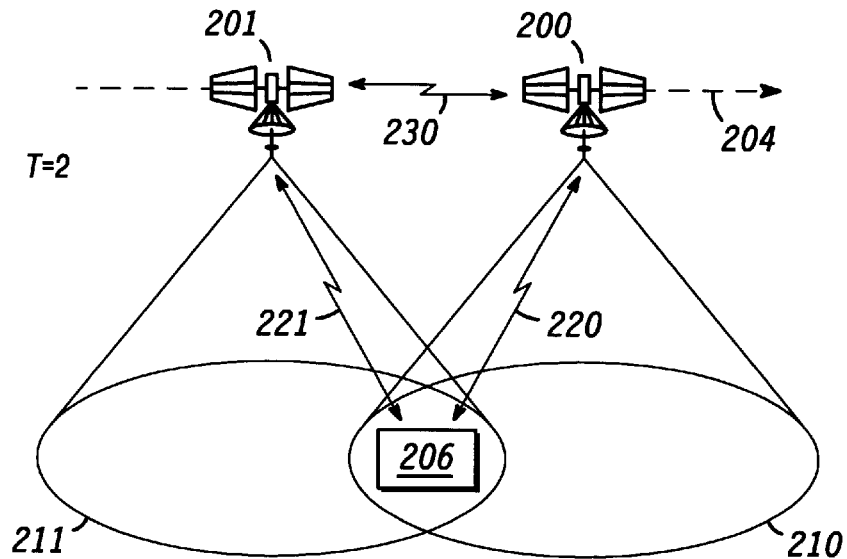
Figure 4:
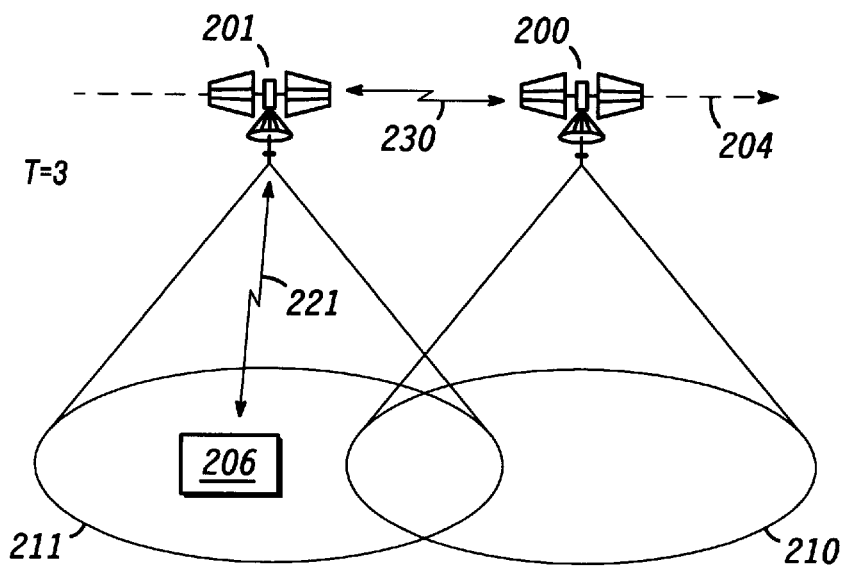

FIGS. 2–4 illustrate a sequence for a communication link hand-off between satellites 200–201 of a satellite system in accordance with the prior art. FIG. 2 illustrates satellites 200–201 at a first time (T=1). Satellites 200–201 travel along orbit path 204 and have coverage areas 210–211, respectively. At T=1, satellite 200 communicates with ground facility 206 over communication link 220. Direct communication link 220 between satellite 200 and ground facility 206 is possible only when coverage area 210 encompasses ground facility 206.

In a preferred embodiment, satellites 200–201 communicate with each other over cross-link 230. Cross-link 230 enables signaling information and communication traffic to be routed through the satellite system via satellites rather than ground links (e.g., bent-pipe links). Therefore, signaling and/or traffic received by satellite 200 through communication link 220 can be disseminated throughout the rest of the satellite system using cross-links (e.g., cross-link 230). Although the method and apparatus of the present invention is described predominantly using cross-links, the method and apparatus of the present invention also applies to systems which use other types of links (e.g., bent-pipe links).

FIG. 2 illustrates satellites 200–201 at a second time (T=2) after satellites 200–201 have traveled along orbit path 204. At T=2, both coverage areas 210–211 encompass ground facility 206. However, coverage area 210 soon will travel beyond ground facility 206 and, thus, a hand-off between satellites 200–201 is necessary to maintain a continuous link with ground facility 206. Using a make-before-break handoff sequence, satellite 200 maintains communication link 220 until communication link 221 can be established between ground facility 206 and satellite 201. Once communication link 221 is established, communication link 220 can be disconnected and the hand-off is complete.

FIG. 4 illustrates satellites 200–201 at a third time (T=3) after satellites 200–201 have further traveled along orbit path 204. At T=3, only coverage area 211 encompasses ground facility 206. Thus, ground facility 206 is capable of communicating with the satellite network only over communication link 221. This hand-off sequence would continue as additional system satellites (not shown) traveled over ground facility 206.

In the event that satellite 201 is incapable of establishing or sustaining communication link 221 with ground facility 206, satellite 200 would not be able to hand-off communications to satellite 201 as depicted in FIGS. 2–3. The inability to hand-off to satellite 201 would result in a coverage hole traveling over ground facility 206. Where ground facility 206 is a GW, the coverage hole would likely have significant consequences. All streams of signaling information and communications traffic which were being routed through the GW to the satellite network would be broken. In some cases, a particular GW could be the only interface between the satellite system and the terrestrial communication systems within a large geographical area (e.g., multiple countries). A coverage hole passing over such a GW would cause all calls and other communications between the satellite system and the terrestrial communication systems to be dropped. Although, in a non-geosynchronous system, the coverage hole eventually would pass over the GW and a different satellite would be able to provide service to the GW, the problem would reappear as the coverage hole passed again over the same or a different GW. The non-functioning satellite could take weeks to repair or replace, or in the worst case, could be irreparable or irreplaceable. During that time, the outages resulting from the coverage hole would continue to significantly degrade the system's performance.

Where ground facility 206 is a CU, the consequences of a coverage hole are significant, but not as severe as for a GW. The link which the CU is using would be disconnected as the coverage hole passed over the CU. The CU user would have to wait until it was again located within the satellite system's coverage area and attempt to establish a communication link at that time.

The method and apparatus of the present invention mitigates the adverse consequences resulting from a coverage hole, from overly-congested links, or from other service-degrading conditions by temporarily using an alternate satellite system to provide communication links. The method and apparatus of the present invention applies to satellite systems whose satellite coverage areas move with respect to the surface of the earth, and also to satellite systems whose satellite coverage areas are substantially static with respect to the surface of the earth. In addition, the method and apparatus of the present invention applies to any satellite system having one or more satellites which can be in low-earth, medium-earth, or geosynchronous orbits or combinations thereof.

Figure 5:
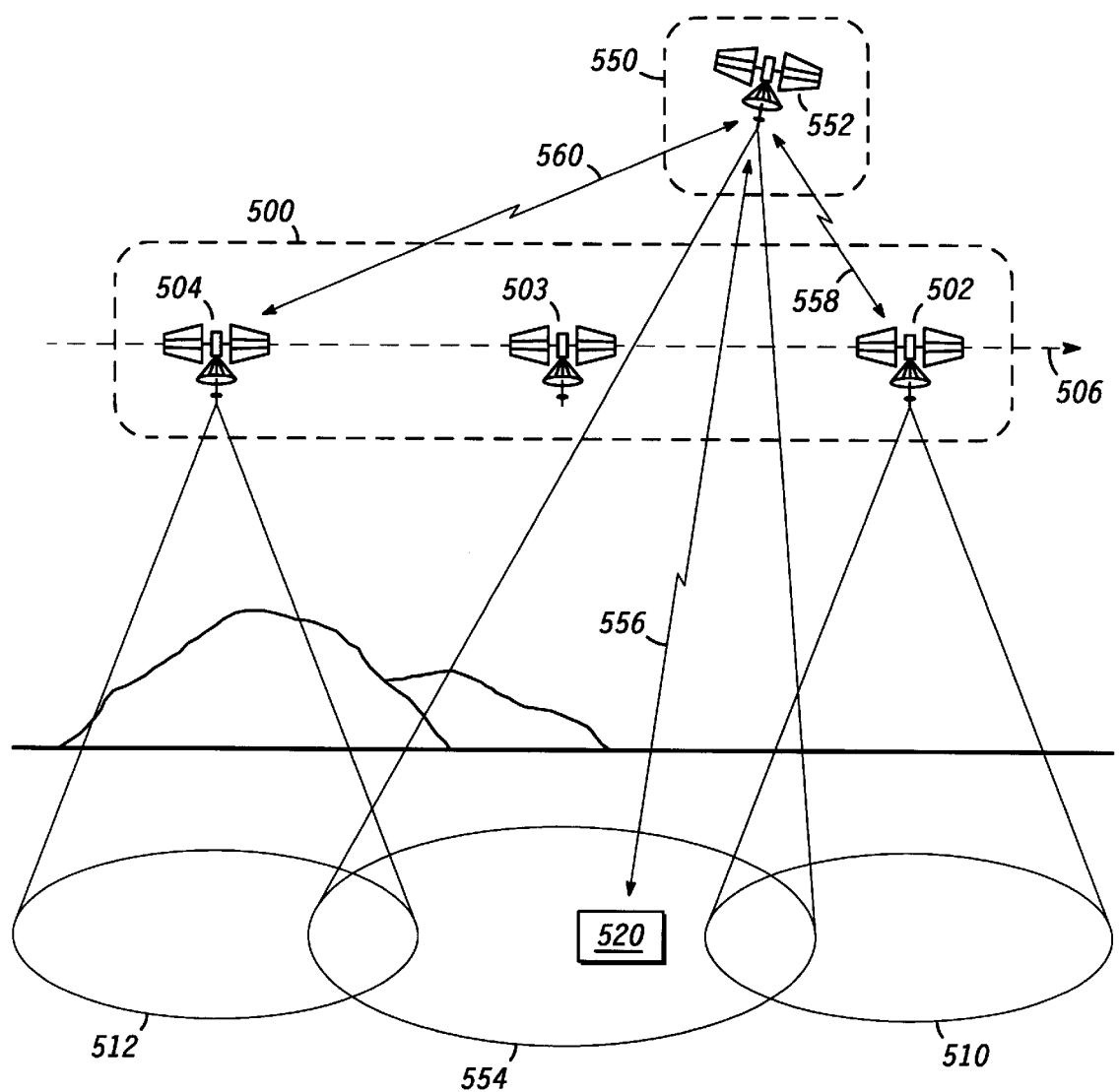
FIG. 5 illustrates a configuration of a primary and alternate satellite communication system in accordance with a preferred embodiment of the present invention.

FIG. 5 illustrates a configuration of primary satellite system 500 and alternate satellite system 550 in accordance with a preferred embodiment of the present invention. Although the illustrated configuration depicts a coverage hole in the primary system coverage area resulting from a non-functioning satellite, the configuration is meant for exemplary purposes and is not intended to limit the scope of the invention. As explained previously, a coverage hole can exist normally or as a result of a planned or unplanned satellite outage.

Primary system 500 comprises satellites 502–504 and alternate system comprises satellite 552. The altitudes of satellites 502–504 and 552 can be low-earth, medium-earth, geosynchronous, or a combination thereof. Satellites 502–504 and 552 can have the same or differing altitudes. The particular altitudes of satellites 502–504 and 552 are not crucial to the present invention.

As described in conjunction with FIGS. 2–4, during normal operations, satellites 502–504 travel along orbit path 506 and provide a continuous communication link with ground facility 520 by handing off from one satellite to another as the coverage areas of satellites 502–504 pass over ground facility 520. FIG. 5 illustrates the method and apparatus of the present invention as applied when a primary satellite is not functioning. The method and apparatus of the present invention can also be applied when, for example, the links supported by primary system 500 are over-congested or other reasons exist for routing primary system traffic through alternate satellite 552.

Primary satellites 502 and 504 have coverage areas 510 and 512, respectively. Satellite 503, however, has no coverage area shown because, in this example, satellite 503 is not currently providing communication services. As satellite 503 passes over ground facility 520, an outage condition would result in a prior art system. The consequences of such an outage are described in detail, above.

In a preferred embodiment, the method and apparatus of the present invention borrows satellite 552 of alternate satellite system 550. Satellite 552 is shown to have a coverage area 554 which encompasses ground facility 520 at a time when no coverage area 510, 512 of the primary system encompasses ground facility 520.

In accordance with the method and apparatus of the present invention, instead of handing off a communication link with ground facility 520 from primary satellite 502 to non-functioning primary satellite 503, the communication link is handed off to alternate satellite 552. Preferred embodiment methods for performing a hand-off to alternate satellite 552 are described in conjunction with FIGS. 6–9.

FIG. 5 illustrates communication link 556 between alternate satellite 552 and ground facility 520. Alternate satellite 552 also supports cross-links 558 and 560 with primary satellites 502 and 504, respectively. Cross-links 558 and 560 enable alternate satellite 552 to receive information destined for ground facility 520 from primary system 500 and also to send information received from ground facility 520 to primary system 500. Alternate satellite 552 need not establish cross-links with both primary satellites 502, 504. In alternate embodiments, alternate satellite 552 can establish a cross-link with only one primary satellite 502 or 504, with a different primary satellite (not shown), or with a ground facility which can interface alternate satellite 552 with primary system 500.

In a preferred embodiment, a hand-off between a primary satellite and an alternate satellite is coordinated between a ground facility which is being handed off, one or more of the primary satellites, one or more of the alternate satellites, and a control facility. FIGS. 6–9 illustrate flowcharts of functions performed by each of these devices, respectively, in accordance with preferred embodiments of the present invention.

Figure 6:
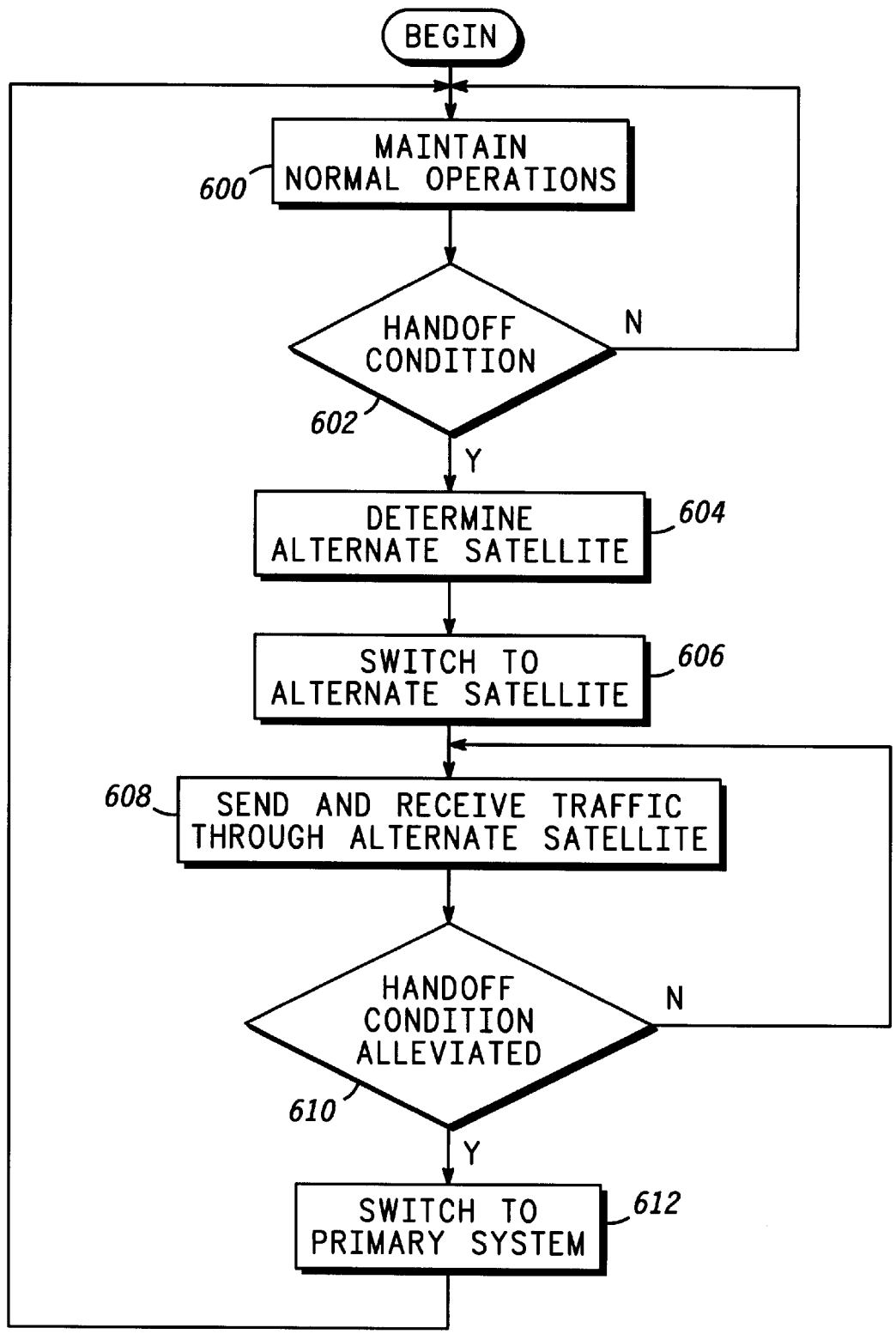
FIG. 6 illustrates a flowchart of a method for a ground facility to communicate using an alternate satellite system in accordance with a preferred embodiment of the present invention.

FIG. 6 illustrates a flowchart of a method for a ground facility (e.g., ground facility 520, FIG. 5) to indirectly communicate with a primary satellite system (e.g., primary satellite system 500, FIG. 5) using an alternate satellite system (e.g., alternate satellite system 550, FIG. 5) in accordance with a preferred embodiment of the present invention. The method begins when the ground facility is maintaining normal operations in step 600. By maintaining normal operations, the ground facility is communicating directly with a primary satellite in whose coverage area the ground facility is located. Normal operations also includes uninterrupted hand-offs to other primary satellites, when needed.

In step 602, a determination is made whether a condition exists which requires a hand-off from the primary system to an alternate system. A hand-off condition would exist for example, if a coverage hole is, or soon will be, in a position such that direct communications with the primary system is not possible for the ground facility. The determination of whether a coverage hole is, or will soon be, in a position which precludes direct communications between the ground facility and the primary system can be made in different ways. In a preferred embodiment, the ground facility detects that a coverage hole exists or will soon exist. For example, where the ground facility is a GW, the GW could make the coverage hole determination based on the GW's inability to acquire the next primary satellite which the GW is scheduled to acquire. Where the ground facility is a CU, the CU could make the coverage hole determination based on the CU's inability to establish a link with any of a number of possible primary satellites to which the CU should be able to hand off.

In an alternate embodiment, the ground facility might receive a message from another device (e.g., a control facility) which indicates that a coverage hole is, or will soon be, in a position such that direct communications with the primary system is not possible.

As explained previously, another hand-off condition might be excess congestion on the primary system links. If no hand-off condition exists, the procedure iterates as shown in FIG. 6 and normal operations continues to be maintained.

In a preferred embodiment, if a hand-off condition does exist, the ground facility determines, in step 604, an alternate satellite which the ground facility can temporarily use to indirectly maintain a link with the primary system. In a preferred embodiment, this determination would include an evaluation of the coverage areas of alternate satellites for one or multiple alternate systems. Where an alternate satellite has a coverage area that encompasses the ground facility, the alternate satellite could potentially support a communication link with the ground facility during the primary system outage.

In an alternate embodiment, knowledge of which alternate satellite will be used in the event of an outage could be pre-determined. Such a pre-determination would be feasible, for example, where the alternate satellite is geostationary and has a coverage area which is essentially fixed with respect to the surface of the earth.

After an alternate satellite is determined, the ground facility switches to the alternate satellite in step 606. In a preferred embodiment, the ground facility switches from the primary satellite to the alternate satellite using a make-before-break hand-off sequence. The ground facility synchronizes with the alternate satellite prior to breaking the communication link with the primary satellite. Once an alternate link with the alternate satellite is achieved, the ground facility disconnects from the primary satellite.

In an alternate embodiment, a communication link between the ground facility and the alternate satellite can be pre-established. Typically, pre-establishment of the communication link is most feasible for a geostationary alternate satellite. A pre-established alternate link would not be used until needed and, thus, no messages normally would be sent across the alternate link. However, when the alternate satellite is needed to provide a link to the ground facility, messages could then be sent across the alternate link. This alternate embodiment would eliminate the need to set up and tear down an alternate link each time a hand-off condition occurs.

In step 608, the ground facility sends and receives signaling information and communication traffic through the alternate satellite, thus indirectly communicating with the primary satellite system. As explained previously, the ground facility can send information to the primary system by sending it across the alternate link to the alternate satellite which, in turn, sends the information to the primary system across one or more cross-links with the primary satellites. The ground facility receives information from the primary system when the primary system sends the information to the alternate satellite over the one or more cross-links and the alternate satellite, in turn, sends the information to the ground facility over the alternate link.

A determination is made in step 610 whether the condition which called for a hand-off in step 602 has been alleviated. Where the hand-off condition was a coverage hole, the hand-off condition would be alleviated when the primary system has re-established coverage of the area in which the ground facility is located. The primary system could re-establish coverage, for example, when another primary satellite has moved in its orbit such that the satellite's coverage area encompasses the ground facility. Alternatively, the non-operating satellite could be repaired or replaced, thus providing coverage again to the area occupied by the ground facility. Where the handoff condition was over-congested links within the primary satellite system, the hand-off condition would be alleviated when the links approached an acceptable operating capacity. As explained previously, other hand-off conditions also could exist.

When the hand-off condition is not alleviated, the procedure iterates as shown in FIG. 6. When the hand-off condition is alleviated, the ground facility switches back to a primary satellite in step 612 and normal operations are resumed in step 600. In a preferred embodiment, switching back to the primary satellite would require the ground facility to acquire and synchronize communications with the primary satellite. In an alternate embodiment, a non traffic-bearing link with the primary satellite could be pre-acquired and switching back to the primary system would entail beginning to transmit and receive communications traffic on the pre-acquired link.

Figure 7:
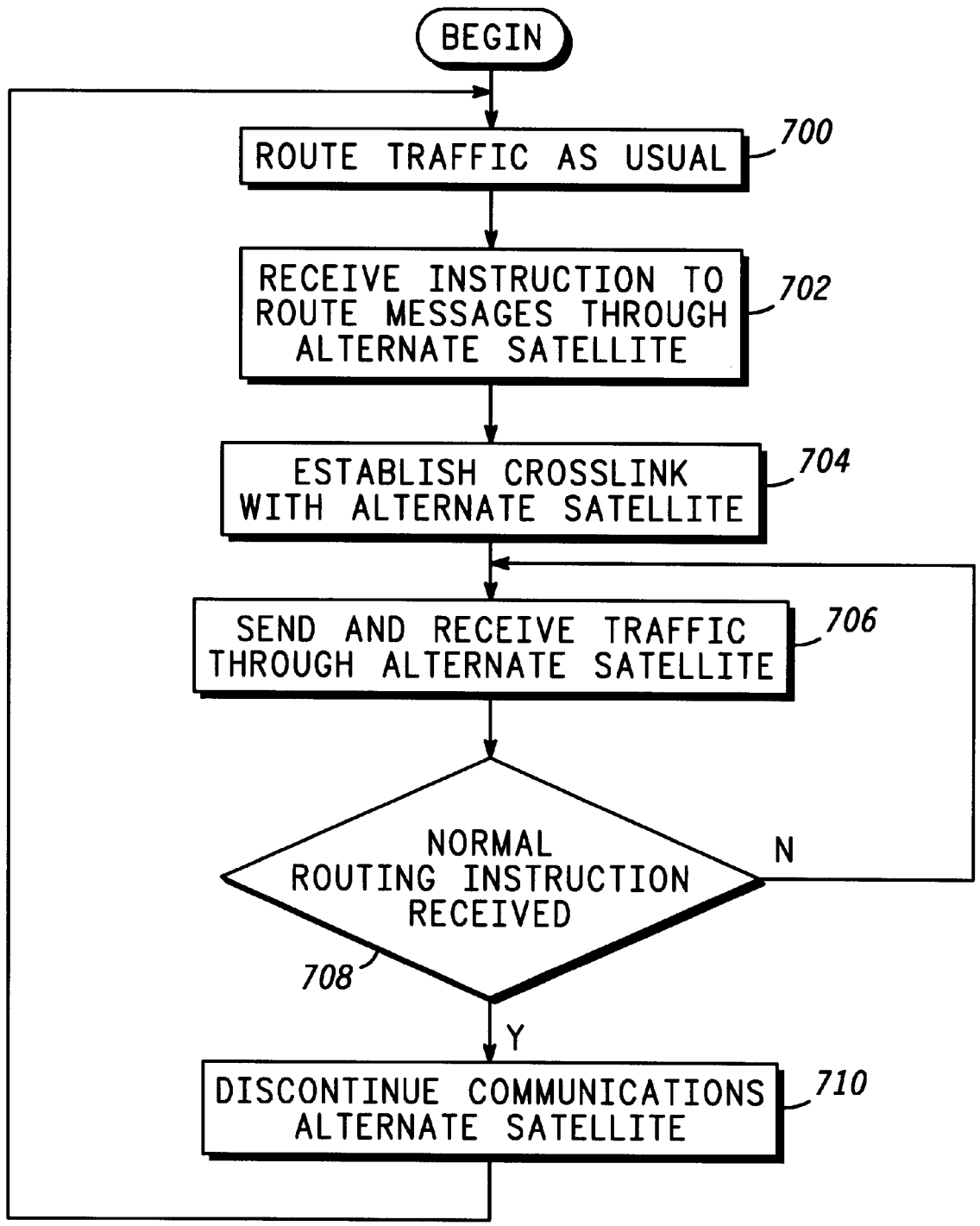
FIG. 7 illustrates a flowchart of a method for a satellite of a primary satellite system to communicate using an alternate satellite system in accordance with a preferred embodiment of the present invention.

FIG. 7 illustrates a flowchart of a method for a satellite of a primary satellite system (e.g., system 500, FIG. 5) to communicate with a ground facility using an alternate satellite system in accordance with a preferred embodiment of the present invention. The method begins when the primary satellite is routing traffic as usual in step 700. Routing traffic as usual includes routing traffic over cross-links to other primary satellites and over downlinks to ground facilities.

In step 702, the primary satellite receives one or more instructions to begin routing messages destined for particular, identified ground facilities (hereinafter "identified ground facilities") through an alternate satellite. The instruction can include an execution time, for example, which indicates that the primary satellite should begin routing through the alternate satellite at a future time indicated by the execution time. Alternatively, the instruction can be a real-time instruction which should be executed by the primary satellite upon receipt The instruction alternatively could include some other execution condition which must be met before the primary satellite should begin routing through the alternate satellite (e.g., a condition that the primary satellite must reach a certain location before executing the instruction).

After receiving the instruction, the primary satellite establishes a cross-link with the alternate satellite in step 704. As explained previously, the cross-link enables the alternate satellite to send information received from a ground facility to the primary system, and also to receive information destined for the ground facility from the primary system. More than one cross-link between primary satellites and the alternate satellite can be established.

After the cross-link is established, in step 706, the primary satellite sends traffic destined for the identified ground facilities through the alternate satellite and receives information from the identified ground facilities through the alternate satellite. In an alternate embodiment, the primary satellite could route traffic through the alternate satellite based on a geographical location of a destination ground facility, rather than based on an identity of the ground facility.

In a preferred embodiment, a determination is made in step 708 whether an instruction to route normally has been received by the primary satellite. Similar to the instruction received in step 702, the instruction to route normally can be real-time, have an associated execution time, or have some other execution condition which indicates when the instruction should be carried out If no instruction to route normally has been received, the procedure iterates as shown in FIG. 7 and the primary satellite maintains the cross-link with the alternate satellite. In a preferred embodiment, if an instruction to route normally has been received, at the time when the instruction is to be executed, the primary satellite discontinues communications with the alternate satellite in step 710 and begins to route traffic as usual in step 700. In a preferred embodiment, discontinuing communications would involve disconnecting the cross-link with the alternate satellite. In an alternate embodiment, the primary satellite can maintain a synchronized cross-link with the alternate satellite, but discontinuing communications would entail ceasing to transmit or receive messages on the cross-link.

Figure 8:
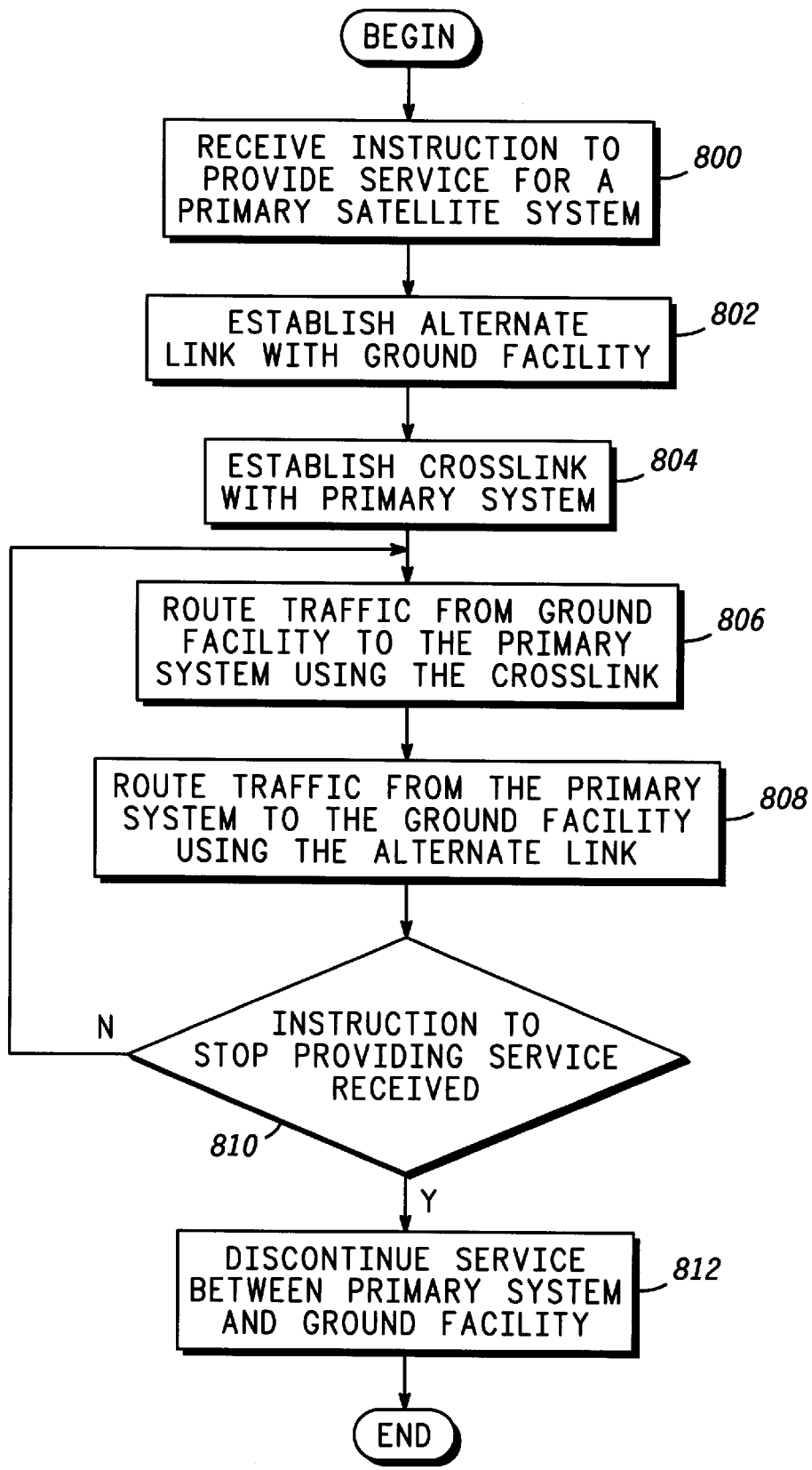
FIG. 8 illustrates a flowchart of a method for a satellite in an alternate satellite system temporarily to provide a communication link for a primary satellite system in accordance with a preferred embodiment of the present invention.

FIG. 8 illustrates a flowchart of a method for a satellite in an alternate satellite system (e.g., system 550, FIG. 5) temporarily to provide communications service for a primary satellite system in accordance with a preferred embodiment of the present invention. The method begins when the alternate satellite receives one or more instructions, in step 800, which indicate that the alternate satellite is to provide service for a primary satellite system. The one or more instructions can be real-time, have an associated execution time, or have an execution condition as explained previously.

In a preferred embodiment, the alternate satellite establishes an alternate link, in step 802, with one or more ground facilities which the alternate satellite has been designated to support In a preferred embodiment, establishing an alternate link would be performed by acquiring and synchronizing with a ground facility. In an alternate embodiment, the alternate link could be preestablished but would not carry messages until needed to do so.

In step 804, the alternate satellite establishes one or more cross-links with the primary satellites. As explained previously, the cross-links enable the alternate satellite to route information between the primary system and the ground facilities which the alternate satellite is supporting. In an alternate embodiment, the one or more cross-links could be pre-established but would not carry messages until needed to do so.

The sequence of steps 802 and 804 is not crucial to the present invention. In alternate embodiments, steps 802 and 804 can be done simultaneously or in a reverse order from that shown in FIG. 8.

In step 806, the alternate satellite routes signaling information and communications traffic received on the alternate link from the ground facility to the primary system over the cross-link In step 808, the alternate satellite routes signaling information and communications traffic received on the cross-link from the primary system to the ground facility over the alternate link. Steps 806 can be performed simultaneously or in reverse order from that shown in FIG. 8.

A determination is made, in step 810, whether an instruction has been received for the alternate satellite to stop providing service between the ground facility and primary system. The instruction could be real-time, have an associated execution time, or have an associated execution condition. When no instruction to stop providing service has been received, the procedure iterates as shown in FIG. 8.

When an instruction to stop providing service has been received, the alternate satellite discontinues service between the primary system and the ground facility in step 812. In a preferred embodiment, the alternate satellite discontinues service by disconnecting the alternate link and the one or more cross-links. In an alternate embodiment, where the alternate link and/or cross-links are pre-established, the alternate satellite discontinues service when it no longer sends or receives messages over the alternate link and/or cross-links. The procedure then ends.

Figure 9:
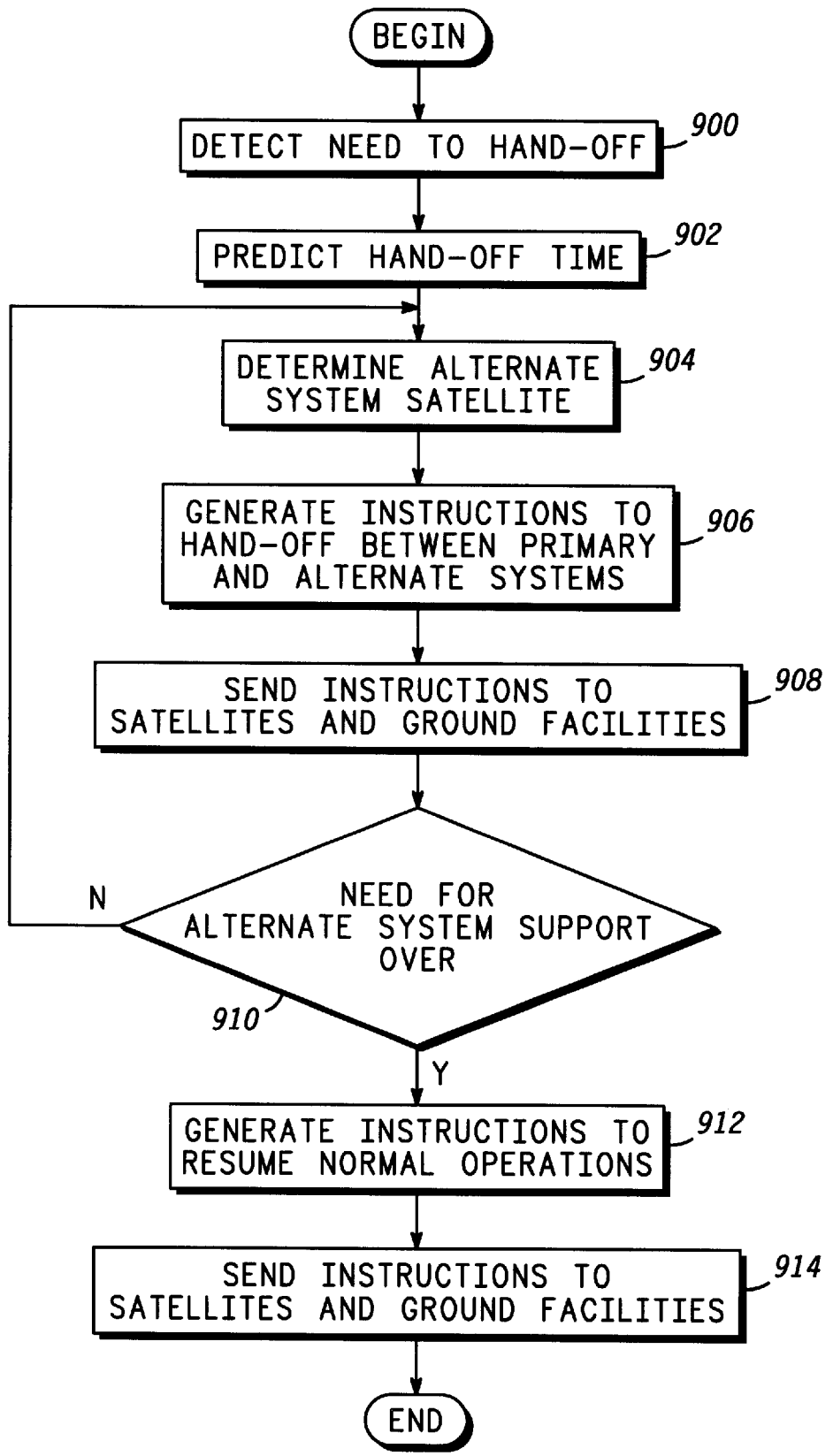
FIG. 9 illustrates a flowchart of a method for a control facility coordinate handoff between a primary satellite system and an alternate satellite system in accordance with a preferred embodiment of the present invention.

FIG. 9 illustrates a flowchart of a method for a control facility to coordinate hand-off between a primary satellite system and an alternate satellite system in accordance with a preferred embodiment of the present invention. In a preferred embodiment, a control facility controls the routing of information through the primary satellite system. When the primary satellite system wants to use an alternate satellite system to help support communication links, the control facility is responsible for controlling the communication link hand-off between the two systems.

The method begins when the control facility detects a need to hand-off communication links to the alternate system in step 900. As described previously, the need to hand-off communication links could arise, for example, due to several types of hand-off conditions. For example a need to hand-off could occur when a hole in the primary system's coverage area exists or is imminent. Other hand-off conditions could include the primary system's need to shunt traffic from its satellites because of over-congestion or other reasons such as routing efficiency or cost.

A need to hand-off because of a coverage hole could be detected, for example, through satellite telemetry (e.g., a satellite fails to report status and, thus, is assumed to be inoperable) or through orbital dynamics calculations. A need to hand-off because of over-congestion on the primary system links could be detected, for example, by monitoring the traffic levels over cross-links and downlinks and evaluating whether the traffic levels are near or exceed predetermined traffic thresholds.

When a need to hand-off is detected, the control facility predicts a time when the hand-off should occur. For example, when the hand-off condition is a coverage hole, and a communication link with an alternate satellite is not pre-established, the hand-off time would be a time which would enable an alternate satellite to establish an alternate link with a ground facility prior to the primary system breaking its communication link with the ground facility.

In step 904, the control facility determines an alternate satellite or satellites which the ground facility can temporarily use to maintain an indirect link with the primary system. In a preferred embodiment, this determination would include an evaluation of the coverage areas of one or more alternate satellites for one or more alternate systems. An acceptable alternate satellite is an alternate satellite which has a coverage area that encompasses the ground facility so that the alternate satellite could support an alternate link with the ground facility during the time period which the primary system needs the alternate link.

In some situations, multiple alternate satellites might be required to provide alternate service for the entire period of time when the alternate link is needed. For example, the satellites of an alternate system could be low-earth orbit satellites which rapidly change position with respect to the earth's surface. Alternate service could be necessary for a period of time which exceeds the ability of a single alternate satellite to provide service (i.e., the satellite would not be in range of the ground facility for the entire period). In such a case, a first alternate satellite would have to hand-off to another alternate satellite of the alternate system or another alternate system satellite (e.g., a geosynchronous satellite) in order to provide the alternate link for the entire period. In a preferred embodiment, in step 904, the control facility determines the multiple alternate satellites which would be required to provide alternate service for the entire period of time when the alternate coverage is needed.

In an alternate embodiment, knowledge of which alternate satellite or satellites will be used in the event that alternate service is needed could be pre-determined. Such a predetermination would be feasible, for example, where the alternate satellite or satellites are geostationary and have coverage areas which are essentially fixed with respect to the surface of the earth.

In step 906, the control facility generates instructions to carry out the hand-off between the primary system and the alternate system. These instructions could be real-time, have an associated execution time, or have an associated execution condition, for example. In a preferred embodiment, the instructions would inform satellites and ground facilities when to establish and/or disconnect communication links in order to hand-off to the alternate satellite. In an alternate embodiment, where alternate links and cross-links are pre-established, the instructions would inform satellites and ground facilities when to begin sending and receiving messages over the preestablished links.

In step 908, the control facility sends the instructions to the satellites and ground facilities which will be affected by the hand-off. This includes instructions for the alternate satellite. The satellites and ground facilities then use the instructions to perform the hand-off procedure.

In step 910, the control facility determines whether the need for the alternate system's support is over. The need for the alternate system's support would be over, for example, when the primary system has re-established coverage over the affected ground facilities or when the primary system's links are no longer overly-congested. If the need for the alternate system's support is not over, the procedure iterates as shown in FIG. 9 and steps 904–908 are repeated. Steps 904–908 should be repeated occasionally because different alternate satellites and/or hand-off instructions might be necessary for the duration of the alternate system's support, for example, where the physical orientation and/or available resources of satellites and ground facilities changes with time.

When the control facility determines that the need for the alternate system's support is over, the control facility generates instructions, in step 912, for the satellites and ground facilities to resume normal operations (i.e., to operate without the assistance of the alternate system). These instructions could be real-time, have associated execution times, or have associated execution conditions. In step 914, the control facility sends the instructions to the affected satellites and ground facilities which, in turn, use the instructions to resume normal operations.

In an alternate embodiment, the control facility could have determined a time when the alternate satellite's support would no longer be needed near the time when the control facility performed step 902. In another alternate embodiment, the control facility could have determined the duration of time when the alternate satellite's support was needed. Knowledge of the time when the alternate satellite's support is no longer needed or the duration of support would enable the control facility to generate commands to resume normal operations and to send those instructions, with associated execution times, to the satellites and ground facilities before, during, or after hand-off. After the instructions to resume normal operations have been sent, the procedure ends.

Figure 10:
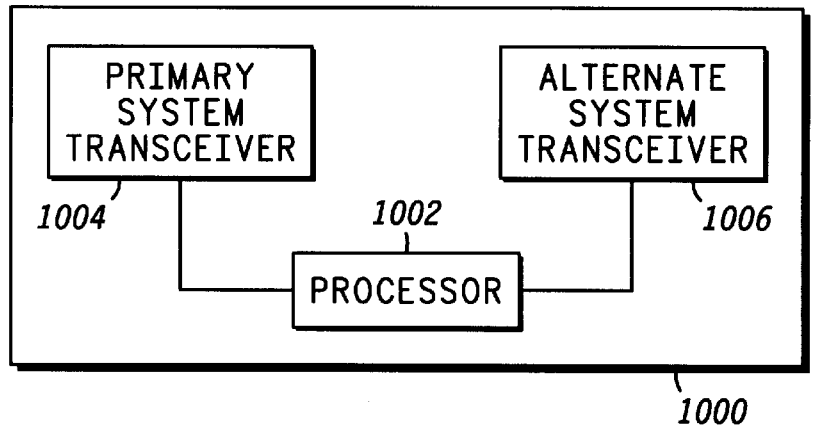
FIG. 10 illustrates a block diagram of a ground facility in accordance with a preferred embodiment of the present invention.
Figure 11:
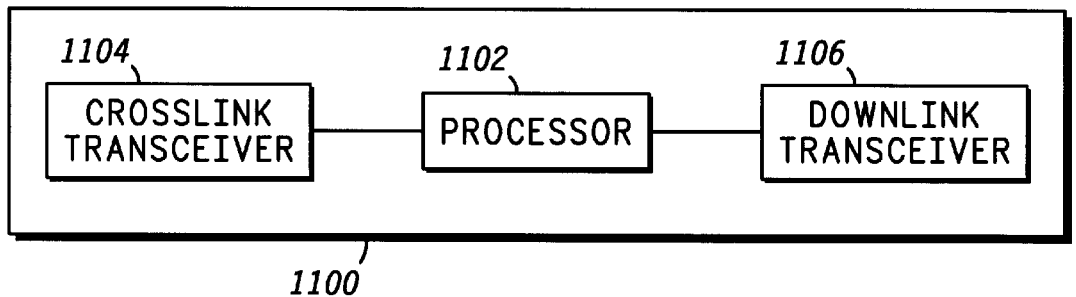
FIG. 11 illustrates a block diagram of a satellite in accordance with a preferred embodiment of the present invention.
Figure 12:
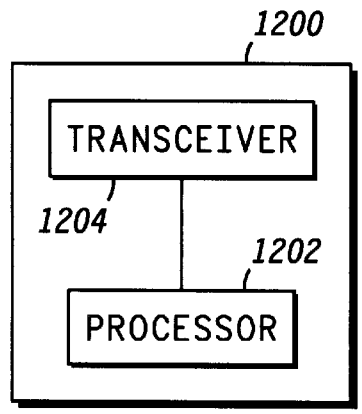
FIG. 12 illustrates a block diagram of a control facility in accordance with a preferred embodiment of the present invention.

Preferred embodiments of apparatuses used to carry out the method of the present invention are described in conjunction with FIGS. 10–12. FIG. 10 illustrates a block diagram of ground facility 1000 in accordance with a preferred embodiment of the present invention. In a preferred embodiment, ground facility 1000 comprises processor 1002, primary system transceiver 1004, and alternate system transceiver 1006. In an alternate embodiment, a single transceiver (not shown) could be used rather than separate primary system transceiver 1004 and alternate system transceiver 1006.

Primary system transceiver 1004 interfaces ground facility 1000 with primary system satellites. Primary system transceiver 1004 is used, typically, during normal operations with the primary system. Alternate system transceiver 1006 interfaces ground facility 1000 with alternate system satellites. Alternate system transceiver 1006 is used, typically, when an alternate satellite is providing a communications interface between ground facility 1000 and the primary system. Processor 1002 sends and receives messages to and from primary system transceiver 1004 and alternate system transceiver 1006 and performs most of the functions described in conjunction with FIG. 6.

FIG. 11 illustrates a block diagram of satellite 1100 in accordance with a preferred embodiment of the present invention. Satellite 1100 comprises processor 1102, cross-link transceiver 1104, and downlink transceiver 1106. Satellite 1100 could be a primary system satellite or an alternate system satellite.

Where satellite 1100 is a primary system satellite, during normal operations, cross-link transceiver 1104 is used to support one or more cross-links with other primary system satellites. Downlink transceiver 1106 is used to support communication links with ground facilities. When an alternate system satellite is being used to provide service for the primary system, cross-link transceiver 1104 could be used to support one or more cross-links with alternate system satellites. Downlink transceiver 1106 may or may not continue to be used to support communication links with ground facilities. Processor 1102 is used to perform most of the functions described in conjunction with FIG. 7.

Where satellite 1100 is an alternate system satellite, cross-link transceiver 1104 is used to support one or more cross-links with primary system satellites. Downlink transceiver 1106 is used to support communication links with ground facilities which the alternate system satellite is supporting for the primary system. Processor 1102 is used to perform most of the functions described in conjunction with FIG. 8.

FIG. 12 illustrates a block diagram of control facility 1200 in accordance with a preferred embodiment of the present invention. Control facility 1200 comprises processor 1202 and transceiver 1204. Transceiver 1204 is used to receive telemetry from primary system satellites and also to transmit instructions either directly or indirectly to primary system satellites, alternate system satellites, and ground facilities which are affected by an inter-system hand-off. Processor 1202 performs most of the functions described in conjunction with FIG. 9.

In summary, the method and apparatus of the present invention enables a handoff to be performed between a primary satellite system and an alternate satellite system when the primary satellite system has a condition where hand-off is necessary to avoid interruption or corruption of communication system services.

While the principles of the invention have been described above in connection with specific apparatus, it is to be clearly understood that this description is made only by way of example and not as a limitation on the scope of the invention.

What is claimed is:

1. A method for a ground facility to hand-off a communication link with a primary satellite system to an alternate satellite system when the primary satellite system experiences a hand-off condition which the primary satellite system wants to alleviate by using communication services of the alternate satellite system, wherein the alternate satellite system supports an alternate communication link which can alleviate the hand-off condition, wherein the hand-off condition is that a coverage area hole exists within the primary satellite system, and wherein the ground facility is a switching gateway, prior to the hand-off to the alternate satellite system, the communication link exists between the switching gateway and a first primary satellite of the primary satellite system, and wherein during a normal hand-off within the primary satellite system, the switching gateway would acquire a second primary satellite of the primary satellite system, the method comprising the steps of:

a) detecting, by the ground facility attempting to acquire the second primary satellite and detecting that the coverage area hole exists within the primary satellite system when the attempt is unsuccessful, because the communication link cannot continue to be maintained with the primary satellite system;

b) determining that the hand-off condition exists based on the detecting step;

c) establishing the alternate communication link with the alternate satellite system; and d) sending traffic to and receiving the traffic from the alternate satellite system over the alternate communication link.

2. A method for a ground facility to hand-off a communication link with a primary satellite system to an alternate satellite system when the primary satellite system experiences a hand-off condition which the primary satellite system wants to alleviate by using communication services of the alternate satellite system, wherein the alternate satellite system supports an alternate communication link which can alleviate the hand-off condition, wherein the hand-off condition is that a coverage area hole exists within the primary satellite system, the method comprising the steps of, wherein the ground facility is a switching gateway, prior to a hand-off to the alternate satellite system, the communication link exists between the switching gateway and a first primary satellite of the primary satellite system, during a normal hand-off within the primary satellite system, the switching gateway would switch to a second primary satellite of the primary satellite system, the method comprising the steps of:

a) detecting, by the ground facility, that the coverage area hole exists within the primary satellite system because the communication link cannot continue to be maintained with the primary satellite system based on receiving an instruction from a control facility that the switching gateway must switch to an alternate satellite of the alternate satellite system rather than to the second primary satellite;

b) determining that the hand-off condition exists based on the detecting step;

c) establishing the alternate communication link with the alternate satellite system; and d) sending traffic to and receiving the traffic from the alternate satellite system over the alternate communication link.

3. A method for a ground facility to hand-off a communication link with a primary satellite system to an alternate satellite system when the primary satellite system experiences a hand-off condition which the primary satellite system wants to alleviate by using communication services of the alternate satellite system, wherein the alternate satellite system supports an alternate communication link which can alleviate the hand-off condition, wherein the hand-off condition is that a coverage area hole exists within the primary satellite system, wherein the ground facility is a communication unit (CU), prior to a hand-off to the alternate satellite system, the communication link exists between the CU and the primary satellite system through a first channel provided by the primary satellite system, during a normal hand-off within the primary satellite system, the CU would hand-off to a second channel of the primary satellite system, the method comprising the steps of:

a) detecting, by the ground facility, that the coverage area hole exists within the primary satellite system because the communication link cannot continue to be maintained with the primary satellite system based on attempting to hand-off to the second channel provided by the primary satellite system;

b) determining that the hand-off condition exists based on the detecting step;

c) establishing the alternate communication link with the alternate satellite system; and d) sending traffic to and receiving the traffic from the alternate satellite system over the alternate communication link.

4. A method for a ground facility to hand-off a communication link with a primary satellite system to an alternate satellite system when the primary satellite system experiences a hand-off condition which the primary satellite system wants to alleviate by using communication services of the alternate satellite system, wherein the alternate satellite system supports an alternate communication link which can alleviate the hand-off condition, wherein the hand-off condition is that a coverage area hole exists within the primary satellite system, wherein the ground facility is a communication unit (CU), prior to a hand-off to the alternate satellite system, the communication link exists between the CU and the primary satellite system through a first channel provided by the primary satellite system, during a normal hand-off within the primary satellite system, the CU would hand-off to a second channel of the primary satellite system, the method comprising the steps of:

a) detecting, by the ground facility, that the coverage area hole exists within the primary satellite system because the communication link cannot continue to be maintained with the primary satellite system based on receiving an instruction from a switching gateway that the CU must switch to an alternate channel of the alternate satellite system rather than to the second channel;

b) determining that the hand-off condition exists based on the detecting step;

c) establishing the alternate communication link with the alternate satellite system; and d) sending traffic to and receiving the traffic from the alternate satellite system over the alternate communication link.

5. A method for handing-off a communication link with a ground facility from a primary satellite system to an alternate satellite system, the method comprising the steps of:

a) detecting, by a control facility, that a hand-off condition exists when a need to hand-off from the primary satellite system to the alternate satellite system arises;

b) predicting, by the control facility, a hand-off time when the primary satellite system should hand-off to the alternate satellite system;

c) generating, by the control facility, a first instruction which instructs a primary satellite of the primary satellite system to hand-off the communication link to an alternate satellite of the alternate satellite system at the hand-off time rather than to hand-off the communication link within the primary satellite system, wherein after hand-off, the first instruction will cause the primary satellite to send traffic to and receive the traffic from the alternate satellite;

d) sending, by the control facility, the first instruction to the primary satellite prior to the hand-off time;

e) receiving, by the primary satellite, the first instruction to hand-off the communication link to the alternate satellite;

f) establishing, by the primary satellite, a cross-link with the alternate satellite as a result of the first instruction;

g) receiving, by the alternate satellite, a second instruction to provide the communication services to the ground facility using an alternate communication link with the ground facility;

h) establishing, by the ground facility, the alternate communication link with the alternate satellite;

j) sending, by the ground facility, traffic to and receiving traffic from the alternate satellite system over the alternate communication link;

k) discontinuing, by the primary satellite, sending and receiving the traffic through the communication link between the primary satellite and the ground facility;

l) sending and receiving, by the primary satellite, the ground facility traffic through the alternate satellite over the cross-link;

m) routing, by the alternate satellite, the traffic from the ground facility destined for the primary satellite system through the cross-link; and n) routing, by the alternate satellite, the traffic from the primary satellite destined for the ground facility through the alternate communication link.

* * * * *